(No Model.)

V. RHODES.
PERFORATED BLADE FOR PLOWS, &c.

No. 447,437. Patented Mar. 3, 1891.

Witnesses
Geo. E. Frech
Wm. Bagger

Inventor
Vernon Rhodes
By his Attorneys,
C. A. Snow & Co.

United States Patent Office.

VERNON RHODES, OF MEMPHIS, TENNESSEE.

PERFORATED BLADE FOR PLOWS, &c.

SPECIFICATION forming part of Letters Patent No. 447,437, dated March 3, 1891.

Application filed September 13, 1890. Serial No. 364,906. (No model.)

*To all whom it may concern:*

Be it known that I, VERNON RHODES, a citizen of the United States, residing at Memphis, in the county of Shelby and State of Tennessee, have invented a new and useful Perforated Blade for Plows, Scrapers, Cultivators, &c., of which the following is a specification.

This invention relates to plows, cultivators, and similar agricultural implements which are provided with blades or scrapers for the purpose of turning, scraping, stirring, or agitating the soil; and it has for its object to construct such blades or scrapers in such a manner that the soil shall be thoroughly loosened, sifted, and pulverized by a single operation, thus leaving it in the best possible condition to receive rain-falls near the roots of plants, to insure the successful germination or growth of the plants.

With these ends in view the invention consists in providing such blades or scrapers with openings or perforations of peculiar construction, for the purposes and in the manner which will be hereinafter fully described, and particularly pointed out in the claims.

Figure 1:
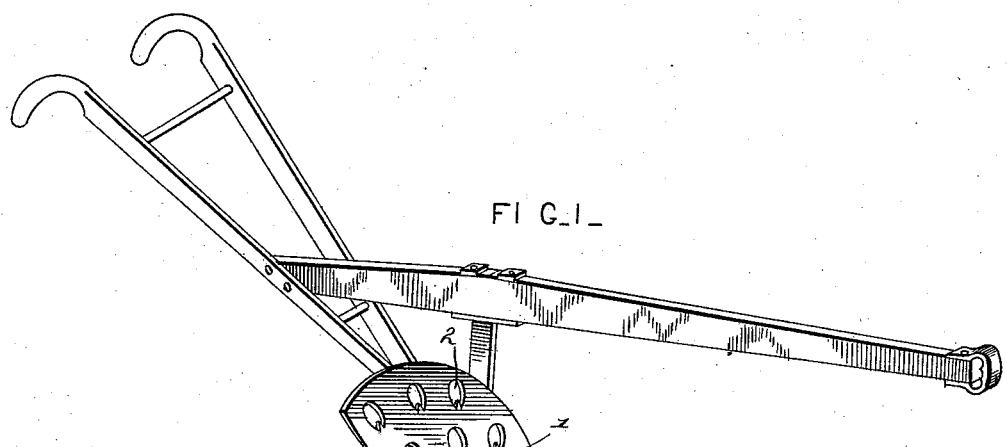
Figure 2:
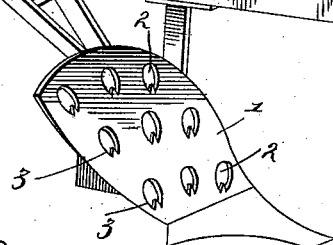
Figure 3:
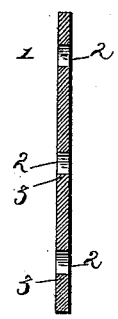
Figure 4:
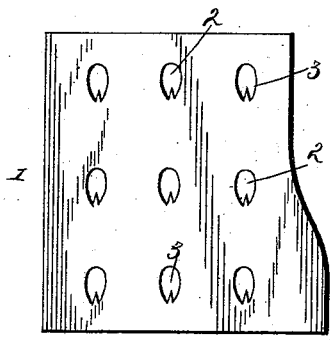

In the drawings hereto annexed, Figure 1 is a perspective view of a plow, the blade of which is constructed according to my invention. Fig. 2 is a perspective view of a scraper constructed according to my invention. Fig. 3 is a sectional view of the said scraper. Fig. 4 is a detail view, on a larger scale, of the mold-board of the plow shown in Fig. 1.

Like numerals indicate like parts in all the figures.

The plow-blade or scraper-blade, both of which are designated by 1, may be constructed either of cast or of wrought metal, and is provided in the process of manufacture with a series of openings or perforations 2 2, which, when the blade is constructed of wrought metal, may be punched or otherwise suitably formed therein. These openings, which are preferably formed in regular rows, are preferably made oval, with the small ends facing downward, and provided with upwardly-extending triangular tongues 3, forming breaking-points that aid in pulverizing the soil.

The operation and advantages of this invention will be readily understood. When the implement having a blade or blades constructed in accordance with my invention progresses over the field, the soil will be sifted through the openings in the said blades, over the tongues or breaking-points 3, and, falling in the rear, covers the hard or crusty surface near the plants made by the pressure of the passing or moving plow. This covering of the hard surface with sifted or loose soil will readily absorb rain and moisture, whereby the germination and growth of seeds and plants is greatly hastened and augmented.

The construction is simple and inexpensive, and the use of the device will be attended with valuable results.

Having thus described my invention, I claim—

1. A blade for plows, cultivators, scrapers, and similar implements, provided with openings the lower edges of which have upwardly-extending triangular tongues, substantially as set forth.

2. A blade for plows, cultivators, scrapers, and similar implements, provided with oval openings the small ends of which face downward and are provided with upwardly-extending triangular tongues, substantially as set forth.

In testimony that I claim the foregoing as my own I have hereto affixed my signature in presence of two witnesses.

VERNON RHODES.

Witnesses:
 SIM. O. BOONE,
 R. G. TUCKER.